(12) United States Patent  (10) Patent No.: US 8,565,557 B2
Au et al.  (45) Date of Patent: *Oct. 22, 2013

(54) FREE VIEW GENERATION IN RAY-SPACE

(75) Inventors: Oscar Chi Lim Au, Hong Kong (CN); Ling Hou, Hong Kong (CN)

(73) Assignee: Kiu Sha Management Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,136

(22) Filed: Mar. 9, 2012

(65) Prior Publication Data

US 2012/0162224 A1   Jun. 28, 2012

Related U.S. Application Data

(63) Continuation of application No. 12/133,617, filed on Jun. 5, 2008, now Pat. No. 8,135,238.

(51) Int. Cl.
*G06K 9/32* (2006.01)

(52) U.S. Cl.
USPC ........ 382/300; 348/42; 375/240.16; 382/132; 382/152; 382/154; 382/274; 382/284; 600/420

(58) Field of Classification Search
None
See application file for complete search history.

(56) References Cited

U.S. PATENT DOCUMENTS

| | | | | |
|---|---|---|---|---|
| 6,078,701 A | * | 6/2000 | Hsu et al. | 382/294 |
| 6,606,404 B1 | * | 8/2003 | Zhang et al. | 382/154 |
| 6,862,364 B1 | * | 3/2005 | Berestov | 382/132 |
| 6,970,591 B1 | * | 11/2005 | Lyons et al. | 382/154 |
| 7,257,272 B2 | * | 8/2007 | Blake et al. | 382/275 |
| 2005/0031191 A1 | * | 2/2005 | Venkatachalam | 382/152 |
| 2005/0111753 A1 | * | 5/2005 | Peleg et al. | 382/284 |
| 2006/0082644 A1 | * | 4/2006 | Tsubaki | 348/42 |
| 2006/0222079 A1 | * | 10/2006 | Park et al. | 375/240.16 |
| 2007/0237236 A1 | * | 10/2007 | Chang et al. | 375/240.18 |
| 2008/0170799 A1 | * | 7/2008 | Chen et al. | 382/274 |

OTHER PUBLICATIONS

Fujii, et al., "Ray space coding for 3d visual communication," in Proceedings of the Picture Coding Symposium, 1996, pp. 447-451.
Tanimoto, et al., "Free-viewpoint television based on ray-space representation," in Proceedings of the SPIE IT Com, 2002, pp. 175-189.
Sekitoh, et al., "Birds eye view system for its," in Proceedings of the IEEE, Intelligent Vehicle Symposium, 2001, pp. 119-123.
Tanimoto, et al., "Offset block matching of multi-view images for ray-space interpolation,". The Journal of the Institute of Image Information and Television Engineers, vol. 58, pp. 540-548, 2004.
Kobayashi, et al., "Interpolation of ray-space data by adaptive filtering," in Proceedings of the SPIE, 2000, vol. 3958, pp. 252-259.

(Continued)

*Primary Examiner* — Tsung-Yin Tsai
(74) *Attorney, Agent, or Firm* — Turocy & Watson, LLP

(57) ABSTRACT

The claimed subject matter relates to an architecture that can facilitate more efficient free view generation in Ray-Space by way of a Radon transform. The architecture can render virtual views based upon original image data by employing Ray-Space interpolation techniques. In particular, the architecture can apply the Radon transform to a feature epipolar plane image (FEPI) to extract more suitable slope or direction candidates. In addition, the architecture can facilitate improved block-based matching techniques in order to determine an optimal linear interpretation direction.

20 Claims, 10 Drawing Sheets

(56) References Cited

OTHER PUBLICATIONS

Tanimoto, "Overview of free viewpoint television." Signal Process. Image Commun., vol. 21, pp. 454-461, 2006.

Jafari-Khouzani, et al., "Radon Transform Orientation Estimation for Rotation Invariant Texture Analysis." In IEEE Transactions on Pattern Analysis and Machine Intelligence, vol. 27, No. 6, Jun. 2005.
OA dated Jul. 19, 2011 for U.S. Appl. No. 12/133,617, 27 pages.

* cited by examiner

FREE VIEW GENERATION IN RAY-SPACE

RELATED APPLICATION

This application is a continuation of U.S. patent application Ser. No. 12/133,617, filed Jun. 5, 2008, and entitled "FREE VIEW GENERATION IN RAY-SPACE," the entirety of which is incorporated herein by reference.

TECHNICAL FIELD

The present disclosure relates generally to free view generation in Ray-Space, and more particularly to constructing arbitrary virtual views based upon Ray-Space interpolation techniques.

BACKGROUND

Ray-Space is one of the representation forms of 3D scenes that focuses on straight line rays passing through a 3D space. Rays in Ray-Space are commonly represented by five parameters: a position (x, y, z), and the ray's direction ($\theta$, $\phi$). However, these five parameters can be reduced to four parameters with a position (x, y) at which a ray passes through a reference plane z=0. According to the Ray-Space concept, acquisition of a view image is a process of sampling and recording ray data from rays that pass through a camera lens. The recorded rays correspond to a 2D subspace of the whole Ray-Space.

The concept of Free Viewpoint Television (FTV), whereby a user can manipulate the viewpoint of a scene displayed by an FTV enabled device, relies upon Ray-Space modeling. However, because it is not practical to capture a scene from every possible camera location (e.g., focal point) that a user might choose with an FTV enabled device, FTV therefore relies on Ray-Space interpolation to generate ray data absent from the Ray-Space. Such absent data typically corresponds to gaps in the image data for which no camera actually imaged a real view. Accordingly, the views for which no real image data exist must be virtually generated, customarily by Ray-Space interpolation techniques. Unfortunately, conventional Ray-Space interpolation techniques produce numerous matching errors and do not provide acceptable rendered views without advance knowledge of the scene. Having advanced knowledge of a scene is generally infeasible, especially in applications such as FTV.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more portions thereof, comprises an architecture that can facilitate more efficient free view generation in Ray-Space by way of a Radon transform. In accordance therewith and to other related ends, the architecture can extract a set of feature points from an epipolar plane image (EPI), and can further construct a feature epipolar plane image (FEPI) based upon the extracted set of feature points. Generally, a feature point corresponds to a scene point in an image (and can be represented by a particular pixel in the image data), but is represented by a line in the FEPI. Ray-Space interpolation typically requires determining a slope of that line in order to provide accurate results. Thus, the architecture can apply a Radon transform to the FEPI in order to limit members of a set of candidate interpolation slopes. In particular, the Radon transform can eliminate from the candidate set many possible (but incorrect) slopes such that determining the slope of the line is commensurately simplified.

In a portion of the claimed subject matter, the architecture can examine original image data in order to construct the EPI as well as the Ray-Space. The EPI can be constructed by stacking together each line in a single epipolar plane. In the EPI, a scene point from the image can be represented by a line in which the slope of the line is an inverse of a depth of the scene point. The Ray-Space can be constructed by examination of the image data in connection with certain camera parameters.

Additionally or alternatively, the architecture can provide a variety of techniques to aid in determining the slope of the line. Once such technique can be provided by employing an intensity function to select feature points when constructing the FEPI. As another example, the architecture can provide a local maximum peak constraint by which false peaks often associated with noise in the original image can be suppressed during the Radon transform. As yet another example, the set of candidate interpolation slopes can be substantially reduced by extracting a maximum of N peaks, where N can be a median average of feature points per row for the EPI. Further still, the architecture can provide an improved block matching interpolation (BMI)-based technique that can further leverage the benefits of the Radon transform.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
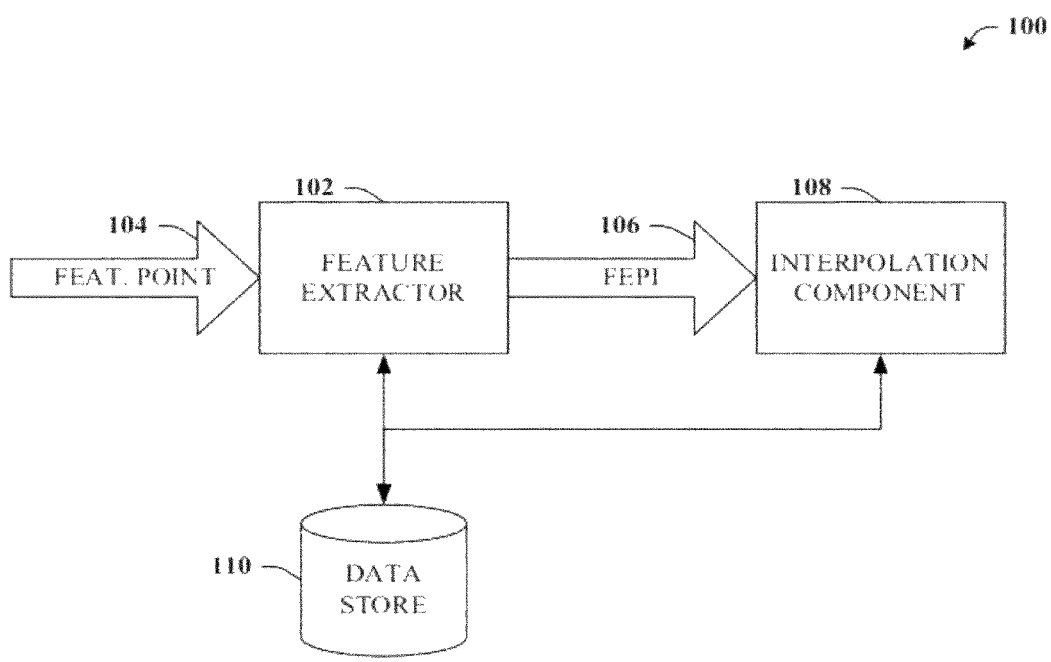
FIG. 1 illustrates a block diagram of a system that can facilitate more efficient free view generation in Ray-Space by way of a Radon transform.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The terms "slope" and "direction" are used substantially interchangeably herein, whether in Cartesian space, Polar space, or discussing a scalar or vector. Generally, slope and direction can refer to a directional component or parameter of a line.

Referring now to the drawings, with reference initially to FIG. 1, system 100 that can facilitate more efficient free view generation in Ray-Space by way of a Radon transform is depicted. Generally, system 100 can include feature extractor component 102 that can extract a set of feature points, denoted herein as feature point(s) 104 whether referring to an individual feature point 104 or a collection or set of feature points 104. Feature extractor component 102 can extract feature points 104 from an epipolar plane image (EPI), various aspects of which are further detailed infra, particularly with reference to FIGS. 2-5. However, briefly, an EPI can be generated from one or more images, for example digital or encoded images or video of a scene.

Accordingly, a given feature point 104 can correspond to a particular feature or scene point in an image of the scene, which can be represented by one or more pixels in the image, yet represented in an EPI as a line. Hence, any point in a real scene can be represented in an image of that scene as a pixel and further represented in an EPI as a line. Based upon the extracted set of feature points 104, feature extractor component 102 can construct a feature epipolar plane image (FEPI) 106. FEPI 106 can be similar to an EPI, but whereas the EPI can include a line for each pixel of an image, FEPI 106 can include only lines that correspond to feature points 104.

Additionally, system 100 can include interpolation component 108 that can receive FEPI 106 from feature extractor component 102 or from another component. Interpolation component 108 can apply a Radon transform to FEPI 106 in order to determine a slope of a line. In particular, according to an aspect of the claimed subject matter, the Radon transform applied to FEPI 106 can be employed to limit members of a set of candidate interpolation slopes. In more detail, Ray-Space is composed of straight lines with different slopes. A primary objective of Ray-Space interpolation is to determine the respective slopes of those straight lines. Thus, when interpolating a line (which can be derived from feature point 104 that can correspond to a pixel in an image), wherein the line is included in FEPI 106, the slope of the line generally must be determined. By reducing the number of possible slopes the line can follow, the task of determining a correct slope for the line can be commensurately simplified. And, as noted, the Radon transform can be employed by interpolation component 108 to reduce the number of possible slopes, which can improve speed and/or efficiency of Ray-Space interpolation and can also improve a rendered result of Ray-Space interpolation.

As an example application, Ray-Space interpolation is one of the key technologies employed to generate arbitrary viewpoint images. Arbitrary viewpoint images can be rendered from source data that captures real views of a scene, and used to interpolate the arbitrary view, or one that is from a different perspective or vantage point (e.g., viewpoint or focal point). Arbitrary viewpoint images can be employed to implement, for example, a Free Viewpoint Television (FTV) system. FTV can truly change the paradigm for television and other viewing experiences by enabling a user to choose the viewpoint within a scene freely. Thus, a given point of view of an image need not remain static, but can be freely manipulated by the user just as a real observer could view a scene from different focal points by changing locations (e.g., changing the direction of view) or by moving closer or farther away (e.g., zoom in/out). The broad concept of FTV is known as is application of the Ray-Space method utilized to implement FTV. Aspects of these and other concepts can be better understood with reference to FIG. 2.

Figure 2:
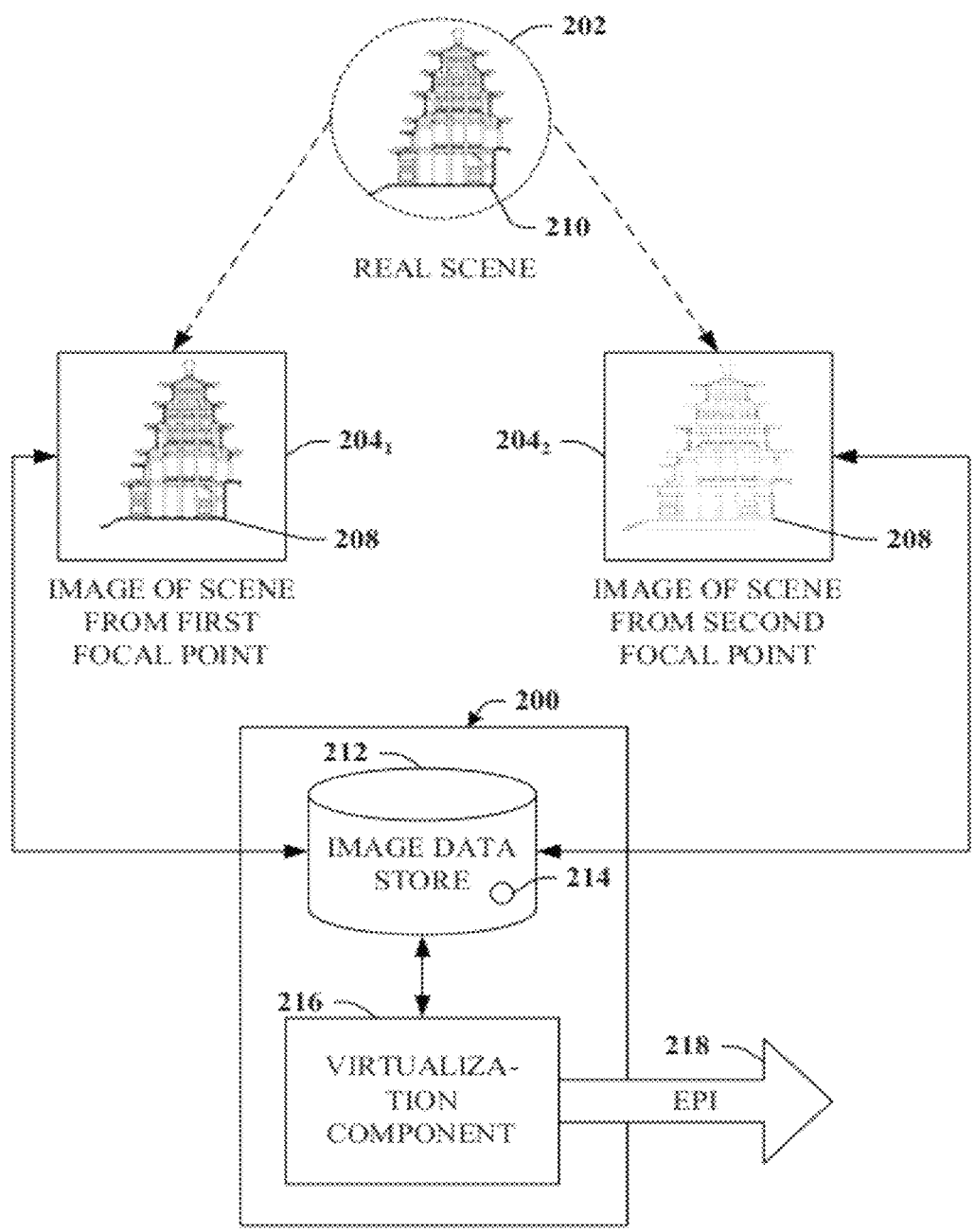
FIG. 2 illustrates a block diagram of a system for constructing an EPI.

Before continuing the description of FIG. 1, FIGS. 2-5 can now be referenced in conjunction with FIG. 1. Turning now to FIG. 2, system 200 can be found, which relates to constructing an EPI. In general, system 200 can include virtualization component 216 that can receive a set of images 204, wherein each image 204 from the set can depict real scene 202 from a disparate focal point along an associated optical axis. Appreciably, virtualization component 216 can receive the images from image data store 212. In order to provide clear understanding, a simplified example of some of the concepts provided herein can be found with reference to FIG. 3.

Figure 3:
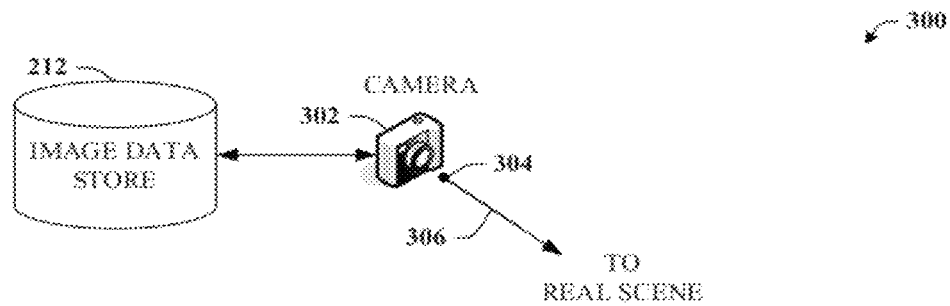
FIG. 3 depicts a single camera system for capturing images of a scene.

While still referencing FIGS. 1 and 2, but turning briefly to FIG. 3, system 300 illustrates a single camera for capturing images of a scene. Depicted here is camera 302 that can image a real scene, such as scene 202 from FIG. 2. The position of camera 302 when a scene is recorded to an image can be referred to as focal point 304, whereas the direction of the lens of the camera can be referred to as optical axis 306. Appreciably image data can be stored to image data store 212, including the pixel data as well as camera parameters (e.g., position, direction, time, camera index number . . . ) and/or certain metadata.

Thus, referring back to FIG. 2, various aspects can now be more readily understood. In this case, scene 202 is a real view of a building from a particular location or focal point (e.g., focal point 304). If an observer snapped a photograph of the building from that particular location, then image $204_1$ would result, which is an image of scene 202 from a first focal point. Next, by moving to a nearby position and snapping a second photograph, image $204_2$ will result, which is an image of scene 202 from a second focal point. Data for both images can be stored to image data store 212.

Based upon image data (e.g., from images $204_1$ and $204_2$, et al.) in association with camera parameters the Ray-Space can be constructed. Ray-Space is a virtual representation of a 3D scene that focuses on rays, or straight lines passing through the 3D space. In practice, image data typically comes from more than one camera exemplified in FIG. 3. Rather, the Ray-Space method customarily involves large camera arrays, wherein each camera images a scene from a different focal point. However, even with camera arrays, with many cameras situated very closely together, the ray data obtained with realistic camera interval is still too sparse in viewpoint axis to apply the Ray-Space method. Accordingly, Ray-Space interpolation is necessary to generate the absent ray data to facilitate feasibility for applications such as a Ray-Space-based FTV. Put another way, since it is normally not conceivable to image every possible view of a scene or enough views of the scene for FTV or other applications, arbitrary viewpoint images must be constructed when, e.g., a user selects a viewpoint for which an associated real view was not actually imaged.

Thus, assuming image $204_2$ was captured from a focal point that is, say, 20 paces to the right of the focal point for image $204_1$, then the Ray-Space for these two focal points is well-defined. However, for a focal point that is midway between the focal points of images $204_1$ and $204_2$, Ray-Space interpolation can be employed and would typically utilize the two nearest neighboring views to generate the virtual view, in this case images $204_1$ and $204_2$. In an aspect of the claimed subject matter, an assumption is made as to certain camera parameters, which is graphically illustrated in FIG. 4.

Figure 4:
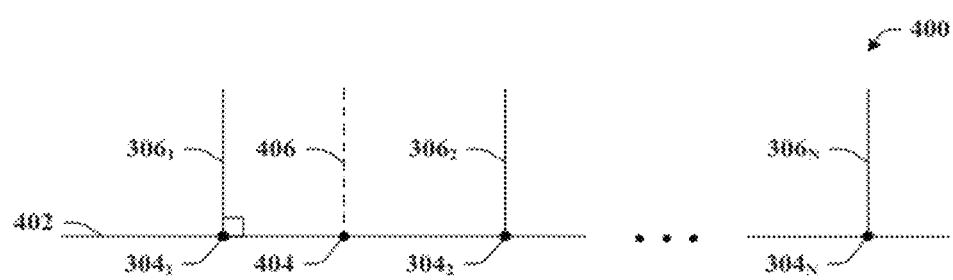
FIG. 4 illustrates an example camera array topology.

Still referencing FIGS. 1 and 2, but referring as well to FIG. 4, example camera array topology 400 is provided. It was noted supra that virtualization component 216 can receive a set of images (e.g., images $204_1$, $204_2$ . . . ), wherein each image respectively depicts a scene from a disparate focal point (e.g., focal point 304) along an associated optical axis (e.g., optical axis 306). As a general assumption, it should be noted that each optical axis 306 can be perpendicular to baseline 402, wherein baseline 402 includes each focal point 304. Moreover, each optical axis 306, in addition to being perpendicular to baseline 402 is parallel to other optical axes 306. Illustrated in example topology 400 are N−1 focal points 304, specifically, focal points $304_1$, $304_2$ . . . $304_N$, all of which lie upon baseline 402. In addition, topology 400 depicts N−1 optical axes, one for each focal point 304, specifically, optical axis $306_1$, $306_2$ . . . $306_N$, all of which are perpendicular to baseline 402 and parallel to one another. It should be appreciated that topology 400 can apply to both a single camera that changes locations or to an array of cameras. In addition, focal point 404 with associated optical axis 406 is inserted to illustrate an arbitrarily selected viewpoint that is not imaged by a camera and must be interpolated, generally based upon the two neighboring views; in this case the views provided by cameras situated at focal points $304_1$ and $304_2$.

Under the above topology constraint, epipolar lines (described infra) can be aligned with image rows. Hence, the epipolar lines included in a single epipolar plane can be stacked together to form EPI 218. Accordingly, virtualization component 216 can aggregate a set of epipolar lines included in a single epipolar plane in order to construct EPI 218. Furthermore, given topology 400, a single scene point maps to a straight line in EPI 218 with the slope representing the inverse depth of the scene point. Thus, in an aspect of the claimed subject matter, virtualization component 216 can map the scene point to the line, wherein the slope of the line can represent an inverse of the depth of the scene point, whereby the depth can be a measure of distance from a focal point to the scene point.

Thus, any given scene point in an image, for example, the scene point denoted by reference numeral 208 can be mapped to a line in EPI 218. Of course, scene point 208 has a corresponding element in real scene 202, which is denoted by reference numeral 210. And scene point 208 can be represented by pixel 214 that can be included in image data stored to image data store 212. Returning to FIG. 1, if scene point 208 is deemed to represent a feature point (and the associated line is extracted from EPI 218 by feature extractor component 102), then the associated line included in EPI 218 can also be included in FEPI 106. In practice, corners, junctures, or other attributes identified by edge-detection techniques are often selected as feature points. Accordingly, a line in EPI 218 that represents scene point 208, which in turn represents a corner of the building foundation (e.g., location 210 in scene 202), is a likely candidate for feature extractor component 102 to extract as feature point 104.

In accordance with the foregoing, for each interpolated point, corresponding pixels along a reference direction in the neighboring captured views can be employed to perform linear interpolation. As a result, determining the slope of the lines is main issue in Ray-Space interpolation, which can be provided by interpolation component 108 as described herein. Conventionally, pixel matching interpolation (PMI) methods and block matching interpolation (BMI) methods have been suggested. These methods seek to find the correspondence from neighboring viewpoint image with a minimum mean square error (MSE) criterion. However, an existing difficulty with conventional BMI and PMI methods is that it is very difficult to preset a search range to meet different situations. Moreover, in the large search range case, for a pixel to be interpolated, it is likely that an incorrect matching pair can yield a smaller MSE than the true pair. Thus, the incorrect matching pair will be selected rather than the true pair. Other Ray-Space interpolation schemes are known that are based on adaptive filtering. In these schemes, a set of filters is prepared a priori, with each filter applying to a different direction. For a pixel that is to be interpolated, the neighboring area of the pixel is analyzed and the best filter is determined. Unfortunately, it is difficult for the predefined filters to adapt to varying scenes. Experimental results from the adaptive filtering schemes show that the interpolation performance is greatly determined by the filter set. Accordingly, the claimed subject matter can provide readily apparent benefits and fulfill a market need in that the disclosed virtual view point image generation can provide much higher quality than images produced by traditional PMI, BMI or other interpolation schemes.

For the sake of completeness, it mentioned that system 100 can include all or portions of system 200 described in connection with FIG. 2. Moreover, system 100 can also include or be operatively connected to data store 110. Data store 110 is intended to be a repository of all or portions of data, data sets, or information described herein or otherwise suitable for use with the claimed subject matter. Thus, although depicted as distinct components data store 110 can include all or portions of image data store 212. Data store 110 can be centralized, either remotely or locally cached, or distributed, potentially across multiple devices and/or schemas. Furthermore, data store 110 can be embodied as substantially any type of memory, including but not limited to volatile or non-volatile, sequential access, structured access, or random access and so on. It should be understood that all or portions of data store 110 can be included in system 100, or can reside in part or entirely remotely from system 100. Furthermore, also for the sake of clear understanding, a brief description of certain relevant features regarding epipolar geometry can be provided with reference to FIG. 5.

Figure 5:
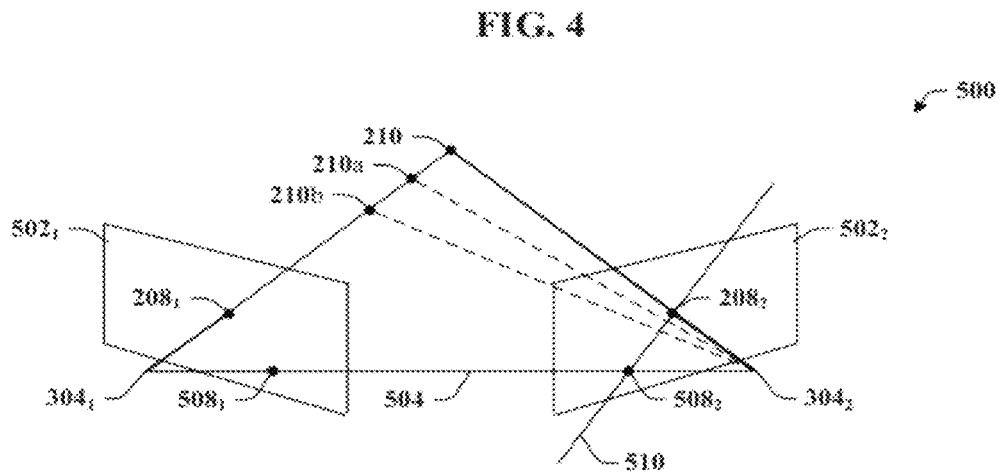
FIG. 5 is an exemplary chart that illustrates various aspects, constraints and/or relationships in connection with epipolar geometry.

Turning now to FIG. 5, an exemplary chart 500 that illustrates various aspects, constraints, and/or relationships in connection with epipolar geometry is provided. Epipolar geometry refers to the geometry of stereo vision. When two cameras view a 3D scene from two distinct positions, there are a number of geometric relations between the 3D points and their projections onto 2D images that, for example, lead to constraints between the image points. These relations are derived based on the assumption that the cameras can be sufficiently well approximated by the pinhole camera model.

Chart 500 is a geometrical representation of two pinhole cameras looking at the same point from different focal points, denoted as $304_1$ and $304_2$. In this example, the point at which both cameras focus is point 210 from real scene 202, which is represented by scene point 208. It should be appreciated that in real cameras, the image plane is actually behind the focal point, and produces a rotated image. With pinhole approximation, however, this projection difficulty is simplified by placing a virtual image plane in front of the focal point of each camera to produce a non-rotated image. As mentioned, $304_1$ and $304_2$ represent the focal points of the two cameras. Portion 210 is the point of interest included in scene 202 for both cameras. $502_1$ represents the virtual image plane for the left camera, while $502_2$ is the virtual image plane for the camera on the right side of chart 500. Points $208_1$ and $208_2$ are the projections of point 210 onto each respective image plane.

Each camera captures a 2D image of the 3D world. This conversion from 3D to 2D is referred to as a perspective projection and is described by the pinhole camera model. It is common to model this projection operation by rays that emanate from the camera, passing through its focal point. It should be understood that each emanating ray corresponds to a single point in the image.

Since the two focal points, $304_1$ and $304_2$, of the cameras are distinct, each focal point is projected onto a distinct point into the other camera's image plane (e.g., image planes $502_1$ and $502_1$). These two projected image points are denoted by $208_1$ and $208_2$, and are called epipoles. Appreciably, epipole $208_1$ and focal point $304_1$ lie on a single line within image plane $502_1$, as does epipole $208_2$ and focal point $304_2$ in its associated image plane $502_2$.

The line $304_1$ to 210 is seen by the left camera as a point because it is directly in line with that camera's pinhole optical axis. However, the right camera sees this line as a line in image plane $502_2$ rather than a point. Such a line (denoted 510) passes through $208_2$ and $508_2$ in the right camera and is called an epipolar line. Symmetrically, the line $304_2$ to 210 is seen by the right camera as a point, yet seen as an epipolar line by the left camera.

As an alternative visualization, consider the points 210, $304_1$ and $304_2$ that form a plane called the epipolar plane. The epipolar plane intersects each camera's image plane (e.g., $502_1$ and $502_1$) where it forms lines—the epipolar lines. The epipolar lines in the right image must intersect the right epipole independent of how point 210 is chosen (e.g., 210a or 210b would be the same point for the left camera, but not for the right camera), and correspondingly for the left image.

With these visualizations explained certain epipolar constraints and triangulations become apparent. If the translation and rotation of one camera relative to the other is known, the corresponding epipolar geometry leads to two important observations: First, if the projection point $208_1$ is known, then its projection line $304_1$ to $208_1$ is known and, consequently, also the epipolar line 510 is known, even though $208_2$ is unknown. However, it must then be the case that the projection of 210 in right image plane $502_2$, $208_2$, lies on this particular epipolar line. This means that for each point in one image the corresponding point in the other image must lie on a known epipolar line. This provides an epipolar constraint which corresponding image points must satisfy and it means that it is possible to test if two points really correspond to the same 3D point. Epipolar constrains can in a convenient way be described by the essential matrix or the fundamental matrix related to the two cameras.

If the points $208_1$ and $208_2$ are known, their projection lines are also known. If the two image points really correspond to the same 3D point, 210, the projection lines must intersect precisely at 210. This means that 210 can be calculated from the coordinates of the two image points, a process called triangulation.

With the foregoing in mind, it is readily apparent why epipolar geometry is employed with interpolation schemes, why a line in an epipolar plane image can represent an inverse depth, and also apparent why successful Ray-Space interpolation often reduces to an exercise in determining a slope of a line in an epipolar plane image such as EPI 218. This can be a non-trivial task, but the Radon transform applied by interpolation component 108 can simply this task appreciably. Further details with respect to Ray-Space, Ray-Space interpolation, and Radon transforms can be found infra in connection with FIGS. 6A and 6B.

Figure 6A:
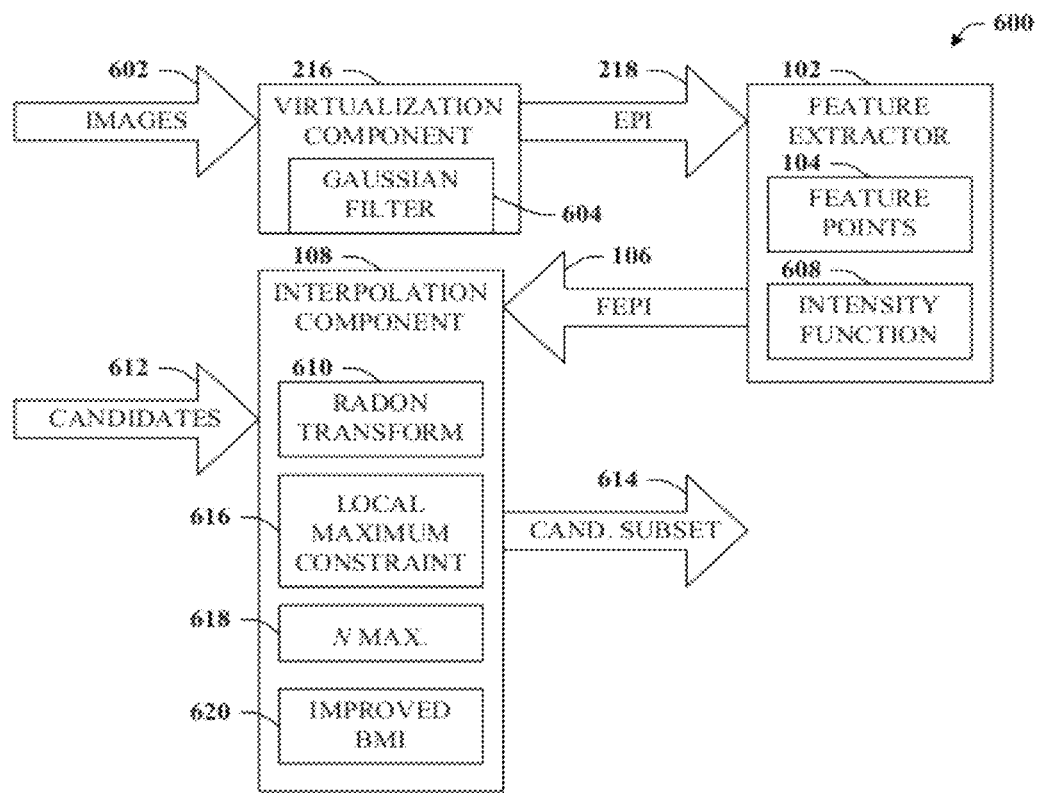
FIG. 6A illustrates a block diagram of a system that can provide various improvements and features associated with facilitating more efficient free view generation in Ray-Space.
Figure 6B:
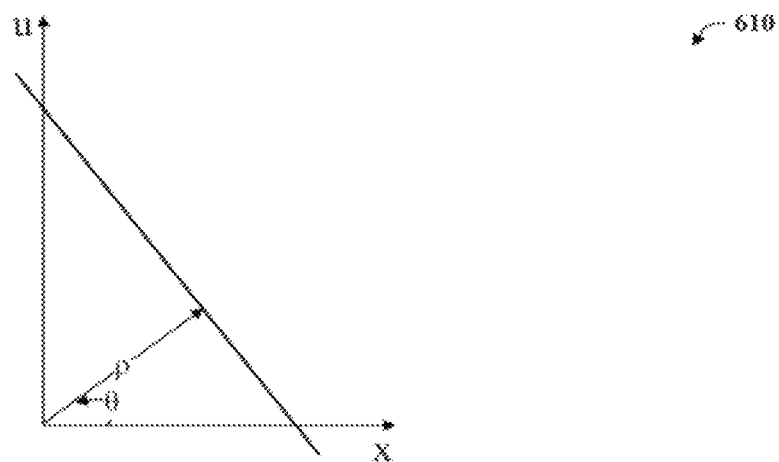
FIG. 6B is an example illustration of a Radon transform.

With reference now to FIGS. 6A and 6B, FIG. 6A illustrates system 600 with various improvements and features that can facilitate more efficient Ray-Space interpolation and/or free view generation in Ray-Space by way of a Radon transform, an example of which is depicted in FIG. 6B. As detailed supra, in Ray-Space representation, one ray in 3D real space can be represented by one point in the Ray-Space. The Ray-Space is a virtual space; however, it can be directly connected to or representative of the real space. The Ray-Space is generated easily by collecting multi-view images (e.g., set of images 602 with each image depicting a scene from a different focal point, which can be received by virtualization component 216) with the consideration of camera parameters. For example, let (x, y, z) be three space coordinates and ($\theta$, $\phi$) be the parameters of direction. A ray going through space can be uniquely parameterized by its location (x, y, z) and the direction ($\theta$, $\phi$); in other words, a ray can be mapped to a point in this 5D ray parameter space. In this ray parameter space, a function, $f$, can be introduced whose value corresponds to the intensity of the specified ray. Thus, all the intensity data of rays can be expressed by:

$$f(x,y,z;\theta,\phi), -\pi \leq \theta < \pi, -\pi/2 \leq \phi \leq \pi/2 \quad (1)$$

For rays that arrive at a reference plane, the dimension of parameter space can be reduced from the original 5D function to a 4D function, $f(x, y, \theta, \phi)$, where (x, y) can denote the intersection of the ray and the reference plane z=0, where ($\theta,\phi$) can be the direction of the ray, and where $f(x,y,\theta,\phi)$ can represent the intensity of the ray. For simplicity, 3D Ray-Space $f(x, y, u = \tan\theta)$ without the vertical disparity $\phi$ is considered here. The $f(x, u)$ with respect to the same scan line of different viewpoint images can be extracted by virtualization component 216 to compose EPI 218. In an aspect of the claimed subject matter, virtualization component 216 can further include or be communicatively coupled to Gaussian filter 604. Thus, virtualization component 216 can apply Gaussian filtering to the received set of images 602 in order to smooth the original images 602 or to minimize or reduce noise effects prior to constructing EPI 218.

In addition to virtualization component 216, system 600 can also include feature extractor component 102 and interpolation component 108. Feature extractor component 102 can extract feature points 104 from EPI 218 and employ feature points 104 to create FEPI 106; while interpolation component 108 can receive FEPI 106 and apply Radon transform 610 to FEPI 106 in order to facilitate determination of a slope of a line in FEPI 106 as substantially described in connection with FIG. 1 and with a more robust feature set described herein.

As mentioned previously, in Ray-Space interpolation, the main computational task presented is to find the slope of the straight lines in an EPI, such as EPI 218. Due to the inherent properties, Radon transform 610 can be a useful tool to capture the directional information contained in images 602 and included by proxy in FEPI 106. Radon transform 610 describes a function in terms of (integral) projections. With reference to FIG. 6B, which depicts an example Radon transform 610, Radon transform 610 of a 2D function, $f(x,u)$, can be defined as:

$$R(\rho, \theta)[f(x,u)] = \int_{-\infty}^{\infty}\int_{-\infty}^{\infty} f(x,u)\delta(\rho - x\cos\theta - u\sin\theta)\,dx\,du \quad (2)$$

where $\rho$ is the distance from the coordinate system origin to the radial line; and $\theta$ is the angle corresponding to the angular orientation of the line. A projection of an image $f(x,u)$ at an angle $\theta$ can therefore be the summation of its intensity along a radial line, which is positioned corresponding to the value of ($\rho$, $\theta$). Furthermore, $\delta(\ )$ can be a Dirac delta function.

It is therefore readily apparent that each pixel of a transformed domain can be associated with a unique line in the original image. Radon Transform 610 can map Cartesian coordinates into polar pixel coordinates and replace the complex search for aligned topologically connected clusters of pixels by the search for relative maxima in the transform domain. These and other features account for distinct improvements over conventional techniques.

For example, given the task of detecting the slope or direction of lines for Ray-Space interpolation, conventional BMI and PMI approaches employ a procedure to find the matching blocks which is similar to that of motion search in video coding. Error matching may occur especially when the searching range is large. Therefore, obvious distortions typically occur in the synthesized virtual view point image. In contrast, given inherent properties of Radon transform 610 that naturally detect the direction of lines in an image, the claimed subject matter can mitigate such obvious distortions in the synthesized virtual view point image.

Appreciably, Radon transform 610 can be applied to FEPI 106, which can be constructed by feature extractor component 102 based upon EPI 218. As discussed, EPI 218 is generally composed of multiple straight lines with different slopes that respectively represent an inverse depth of a corresponding point in a scene. Accordingly, in an aspect of the claimed subject matter, FEPI 106 can be generated by extracting feature points 104 that exist at different depths in EPI 218. The possible interpolation direction for a given line (e.g., candidate directions/slopes 612) can be reduced to a subset of candidates 614 by application of Radon transform 610 to FEPI 106.

In order to improve the reliability of results from Radon transform 610 even further, in an aspect of the claimed subject matter, feature extractor component 102 can extract the set of feature points 104 from EPI 218 based upon an intensity of a pixel that displays the scene point (e.g., based upon an intensity of pixel 214 that represents scene point 208 of an image that in turn represents a portion 210 of real scene 202). Intensity function 608. Feature extractor component 102 can therefore extract feature points 104 according to intensity function 608. For example, for each real view row u in EPI 218, FEPI 106 can be generated by extracting feature points 104 from among the pixels with E(x,u)>0, where E(x,u)=$f$(x+1,u)−$f$(x,u):

$$I(x, u) = \begin{cases} 255, & \text{if } E(x,u) > \overline{E} + \sqrt{\sigma_E^2}\,; \\ 0, & \text{otherwise.} \end{cases} \quad (3)$$

Where $\overline{E}$ and $\sigma_E^2$ can be the mean and variance of E(x,u), respectively, and where the points with I(x,u)=255 are feature points 104. If several consecutive pixels in one row are extracted as feature points 104, the pixel with the largest E can be selected rather than including all of the consecutive pixels. Accordingly, in an aspect of the claimed subject matter, feature extractor component 102 can select a single representative feature point 104 from a substantially contiguous series of feature points included in one row of EPI 218, wherein the representative feature point 104 can correspond to a pixel with a largest E, and where the single representative feature point 104 can be included in FEPI 106. Appreciably, feature extractor component 102 can further omit other feature points 104 included in the series from FEPI 106, such as the non-representative feature points 104.

In accordance therewith, feature points 104 of each real view line in EPI 218 can thus be extracted. Moreover, in comparison to using absolute value of E(x,u) for selecting features, the claimed subject matter can provide an additional advantage of a reduced number of parallel feature lines as well as improved reliability of the interpolation direction.

As described herein, Radon transform 610 can be applied to each FEPI 106 to find the possible interpolation direction (e.g., candidates 614) of the corresponding EPI 218. And, additionally, Radon transform 610 of an image $f(x,u)$ at an angle θ can be the intensity summation along a radial line. Therefore, the local maximum peak (ρ,θ) in the parameter space can correspond to a possible line in FEPI 106 and a possible interpolation direction can be calculated from the θ of an extracted peak.

It should be understood that some extracted peaks in the parameter domain may be false peaks due, e.g., to erroneous edge detection especially when noise is present. Such false peaks do not correspond to any actual lines. Results of experimentation illustrate, however, that the values provided by Radon transform 610 usually have larger variation $\sigma_\theta^2$ along the true line direction. In accordance therewith, the variance of a Radon transform 610 value in this direction is a true local maximum rather than a false peak. Therefore, according to an aspect of the claimed subject matter, interpolation component 108 can apply local maximum constraint 616 to local maxim in order to suppress false peaks, wherein constraint 616 can be $$\frac{d^2 \sigma_\theta^2}{d\theta^2} > 0.$$

As a result, the θ of the local maximum peaks meeting $$\frac{d^2 \sigma_\theta^2}{d\theta^2} > 0$$

in Radon Transform domain can be extracted and included in candidates 614, whereas false peaks can be omitted from candidates 614.

Furthermore, it was discovered that the number of feature points 104 in each real view row of FEPI 106 can typically differ. However, the median number, N, of feature points 104 per row can reflect the number of feature lines in EPI 218 more accurately. Therefore, the maximum number of extracted local maximum peaks 618 can be set to N by, e.g., interpolation component 108. Experimentation verifies that utilizing N max 618, the candidate interpolation direction set 614 can be greatly reduced, especially in the large search range case.

In an aspect of the claimed subject matter, interpolation component 108 can further employ improved block matching interpolation technique 620, which is detailed infra. As previously described, conventional PMI and BMI techniques detect all the pixels within the preset search range to find the optimal interpolation direction. If prior knowledge of a scene's depth ranges is provided, such that the smallest disparity $d_{min}$ and largest disparity $d_{max}$ between two real views r and r+k (supposing k−1 virtual views between two real views) is known in advance, a reasonable search range for the PMI and BMI can be selected. It should be appreciated that d can be a distance between two matching pixels in views i and i+k in x direction. For example, d can equal the x coordinate of one of the matching pixels in view i+k minus that of the other matching pixel in view i. However, scenes can vary dramatically from one to another. Moreover, the disparities for many applications are not known and cannot be reliably predicted in advance, so in conventional techniques $d_{min}$ and $d_{max}$ must be adjusted for different situations, the necessary adjustments oftentimes cannot be known in advance. Experimentation shows that the accuracy of $d_{min}$ and $d_{max}$ can greatly influence the interpolation results for conventional techniques.

Furthermore, even if $d_{min}$ and $d_{max}$ are known in advance, it is still highly likely for conventional techniques to choose an incorrect matching pair with smaller MSE than the true matching ones, especially in large search range cases. However, as described supra, Radon transform 610 can mitigate such difficulties and aid in omitting impossible interpolation directions from the candidate direction set 614. In accordance therewith, not only can the number of candidate directions can be reduced, but performance can also be substantially improved. Moreover, in an aspect of the claimed subject matter, only the view direction, specifically, from left to right or from right to the left, is required to set the angle range of Radon transform 610.

In accordance with improved BMI 620, for a pixel at (x, r+i) to be interpolated, where 1≤i≤k−1, the two nearest neighboring real views, r and r+k, can be employed as reference views. One or more 1D neighborhood blocks can be defined for the two reference views, and the disparity d between the two reference views r and r+k can be calculated for a given direction. Sum of square error (SSE) can be utilized as criteria to calculate the distortion of block pairs in the two reference views according to:

$$SSE(d) = \sum_{l=-W}^{W} \left[ f\left(x + \left|\frac{k-i}{k}\right| d + l, r+k\right) - f\left(x - \left|\frac{i}{k}\right| d + l, r\right) \right]^2 \quad (4)$$

where, the block size can be 2W+1. Hence, the optimal disparity can be the d in the candidate disparity set D that minimizes the SSE function by:

$$d_{opt} = \underset{d \in D}{\operatorname{argmin}} SSE(d) \quad (5)$$

For completeness, it should be noted that although the claimed subject matter can substantially reduce the probability incorrect matching by, e.g., removing the impossible interpolation directions, ambiguous results might still be possible with the remaining candidate directions. Such a case exists because, while an objective of view interpolation is to find the true matching pairs for each point to be interpolated, the SSE criteria generally only minimize the distortion. Thus, an incorrect matching pair can yield a smaller SSE than the true matching pair especially in textureless cases. In order to mitigate, reduce, or remove these situations, some additional constraints can be added to further enhance improved BMI 620. As one example, interpolation component 108 can remove a pixel from the candidate set, D, once the pixel has been associated with another pixel during interpolation. Appreciably, this latter feature can exploit the uniqueness property of pixel correspondence. More specifically, for each pixel in one view, there should be at most one corresponding pixel in another view. For the pixel at (x, r+i) to be interpolated (1≤i≤k−1), given a candidate interpolation direction, the x coordinate at reference view r (or r+k) can be calculated as $$x - \left|\frac{i}{k}\right| d \left( \text{or } x + \left|\frac{k-i}{k}\right| d \right).$$

If the pixel at $$\left(x + \left|\frac{k-i}{k}\right| d, r+k\right) \text{ or } \left(x - \left|\frac{i}{k}\right| d, r\right)$$

has already been associated with another pixel with a reasonable SSE (e.g., smaller than a threshold which can be adaptive to block size), that pixel can be removed from the candidate direction set 612 and therefore omitted from the subset 614.

Moreover, as further improvement over existing Ray-Space interpolation techniques in which only the spatial correlation in a current EPI is considered, the claimed subject matter can also consider correlation between adjacent EPIs. This is possible since the corresponding rows in adjacent EPIs can actually be neighboring rows in the original set of image 602. Therefore, candidate direction set 614 contains not only the possible directions detected in the current EPI 218, but also the optimal ones inherited from the previous EPI 218. These and other features can improve the spatial continuity of a generated virtual view in the vertical direction and at the same time reduce the impact caused by erroneous feature extraction.

FIGS. 7, 8, 9, and 10 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
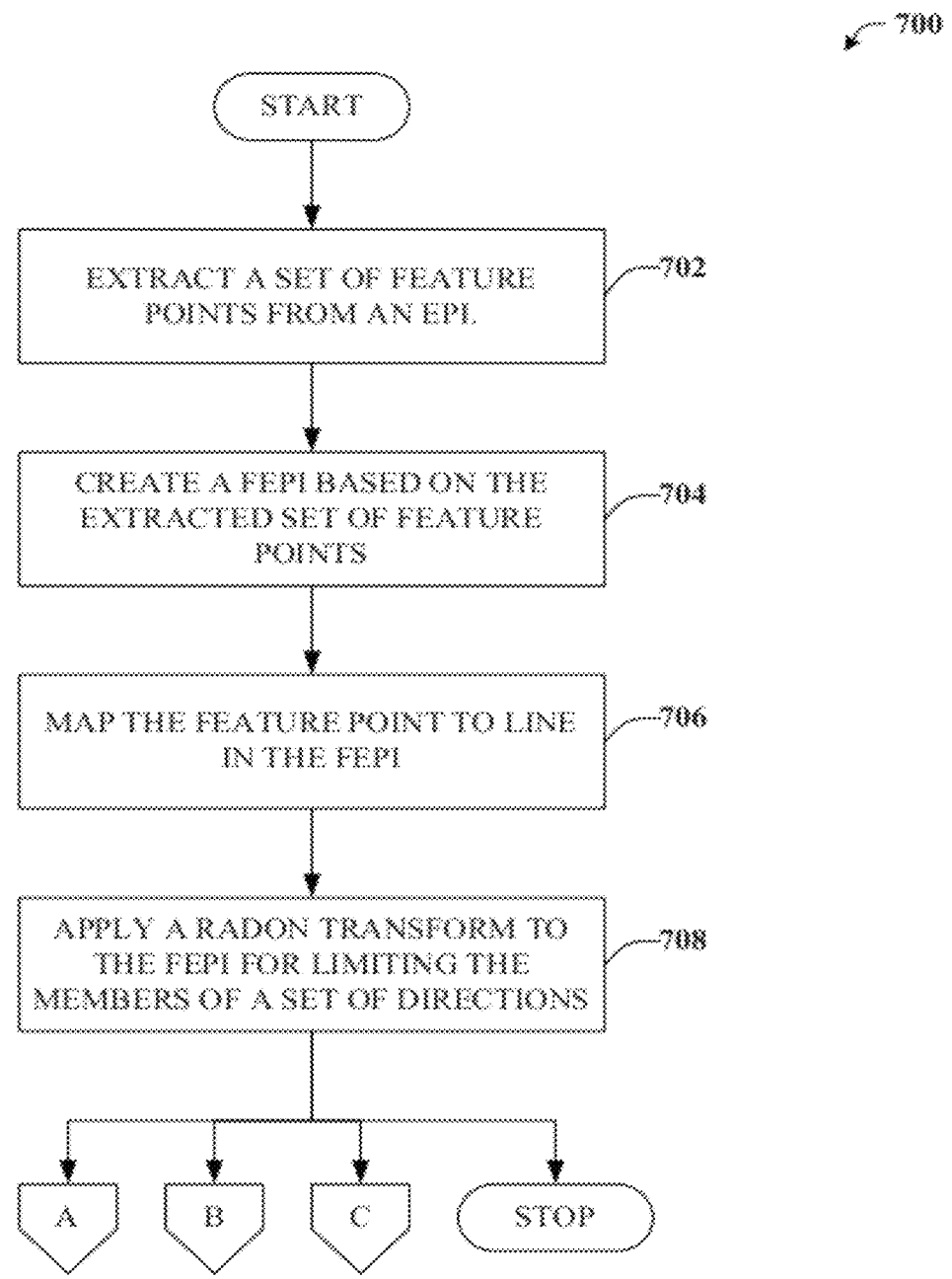
FIG. 7 depicts an exemplary flow chart of procedures that define a method for facilitating free view generation in Ray-Space in a more proficient manner by employing a Radon transform

With reference now to FIG. 7, exemplary method 700 for facilitating free view generation in Ray-Space in a more proficient manner by employing a Radon transform is illustrated. Generally, at reference numeral 702, a set of feature points can be extracted from an EPI, wherein a feature point can correspond to a scene point in an image of a scene. Appreciably, the scene point can represent a feature in a real view of the scene. This feature can be represented as a pixel in an image of the scene, and further represented as a line in the EPI. At reference numeral 704, a FEPI can be created based upon the feature points extracted from the EPI at act 702.

Next, at reference numeral 706, the feature point can be mapped to a line in the FEPI, just as in the EPI any given pixel or point (as opposed to exclusively feature points) can be mapped to a line. At reference numeral 708, a Radon transform can be applied to the FEPI for limiting the members of a set of possible interpolation directions. By limiting the possible interpolation directions, the slope or direction of a line in the FEPI can be more accurately determined and virtual views can be rendered with fewer errors.

Figure 8:
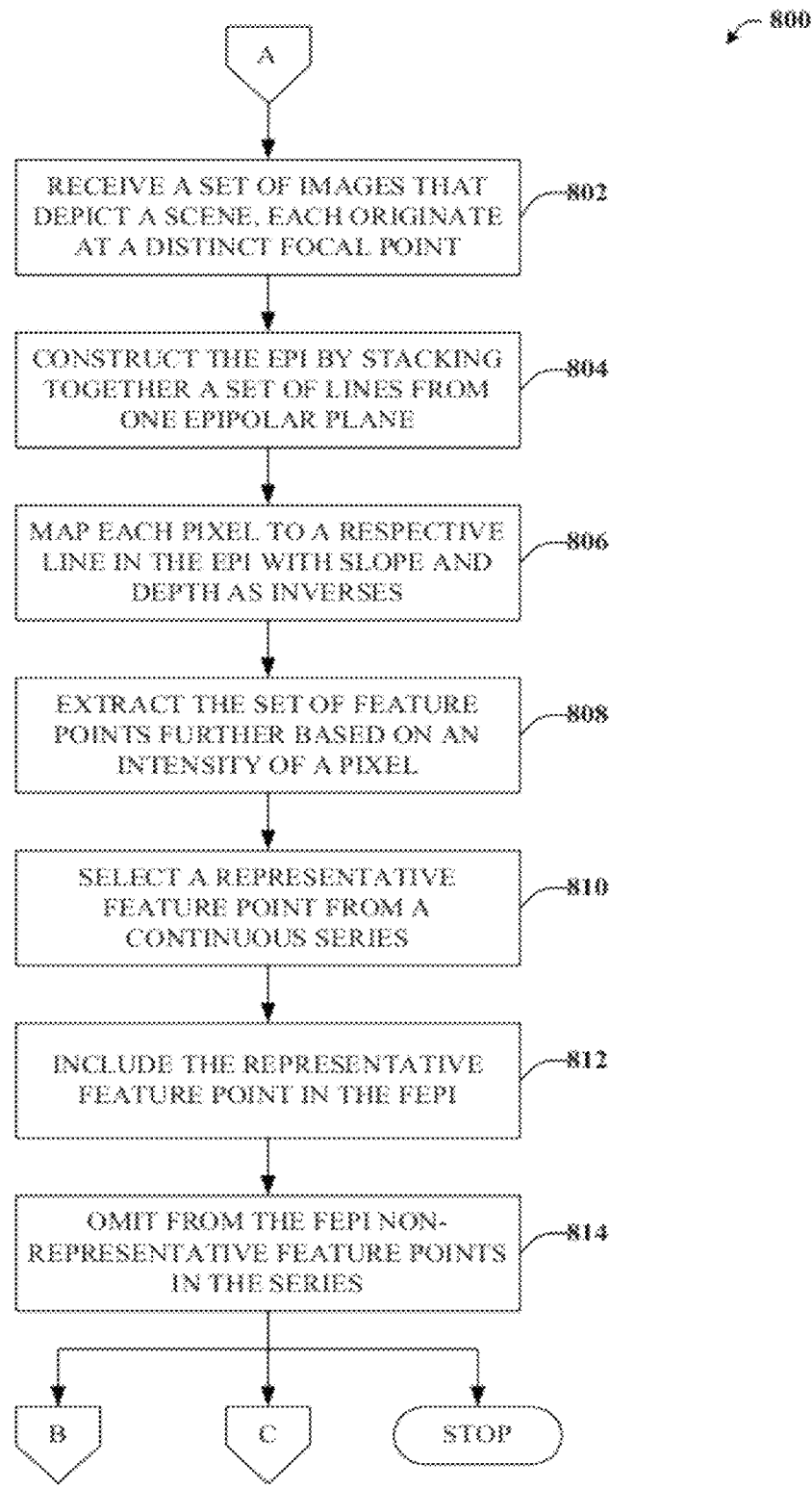
FIG. 8 illustrates an exemplary flow chart of procedures that define a method for constructing an EPI and/or constructing an enhanced FEPI.

Referring to FIG. 8, exemplary method 800 for constructing an EPI and/or an enhanced FEPI is depicted. Initially, at reference numeral 802, a set of images can be received. Typically, the received set of images depicts the scene along disparate optical axes, wherein each optical axis can originate at a separate focal point. The set of images can therefore be provided by a single camera that changes location or by an array of cameras, each of which occupies a distinct location at a respective focal point.

At reference numeral 804, the EPI can be constructed by stacking together a set of epipolar lines included in one epipolar plane. Similar to act 706 where feature points can be mapped to lines in the FEPI, at reference numeral 806, each pixel in the image can be mapped to a respective epipolar line in the EPI, whereby a slope of the respective line can be a measure of inverse depth. In other words, the slope of the respective line can represent a distance from the focal point to the location of the real scene that an associated pixel represents.

Next, at reference numeral 808, the set of feature points extracted at act 704 can be further based upon an intensity of a pixel representing an associated scene point from the image. For example, for each real view row u in the EPI, the associated FEPI can be generated by extracting feature points from among the pixels with E(x,u)>0, where E(x,u)=f(x+1,u)−f(x,u) in accordance with equation (3) provided supra. Accordingly, the points with I(x,u)=255 can be the feature points.

Moreover, at reference numeral 810, a representative feature point can be selected from a substantially continuous series of feature points included in a row of the EPI, wherein the representative feature point can correspond to a highest intensity pixel. For example, if several consecutive pixels in one row are extracted as feature points, the pixel with the largest E can be selected rather than including all of the consecutive pixels. Appreciably, at reference numeral 812, the representative feature point can be included in the FEPI, whereas at reference numeral 814, non-representative feature points included in the series can be omitted from the FEPI.

Figure 9:
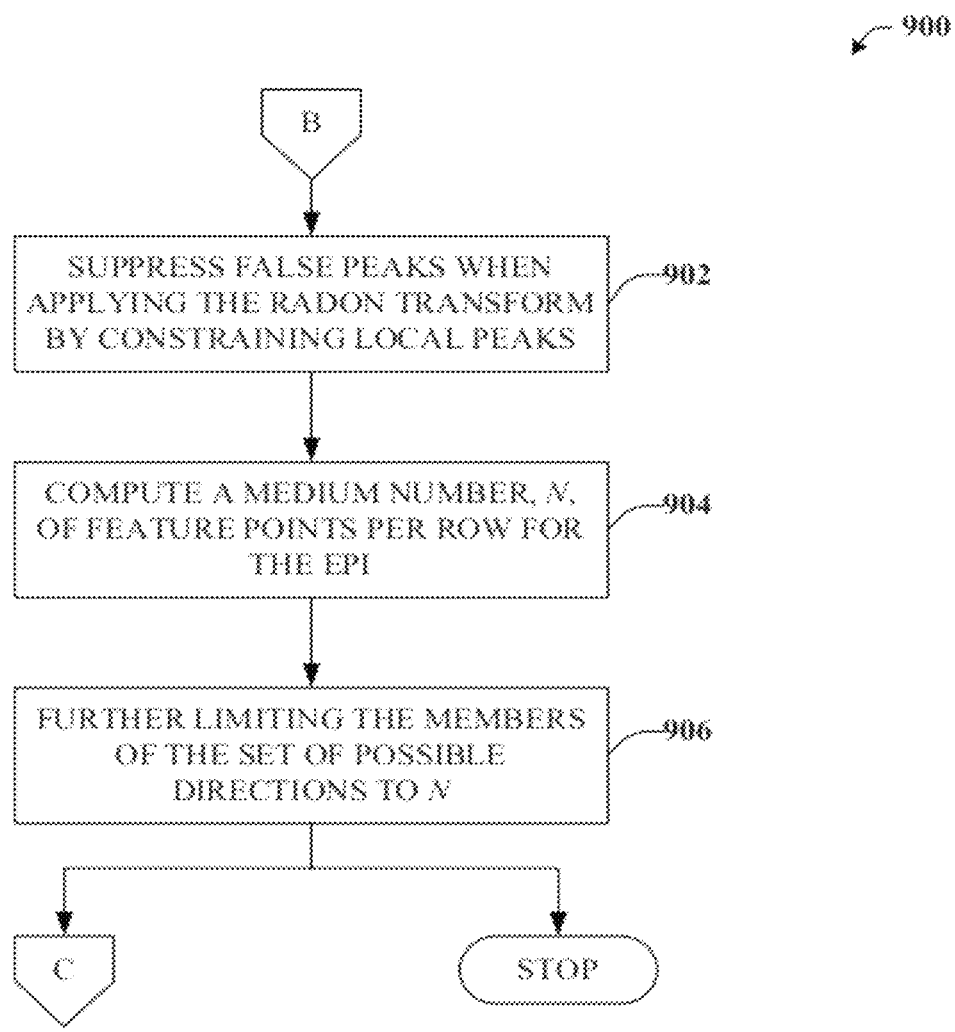
FIG. 9 depicts an exemplary flow chart of procedures defining a method for providing additional features with respect to limiting a candidate set of directions.

With reference now to FIG. 9, method 900 for providing additional features with respect to limiting a candidate set of directions is illustrated. Generally, at reference numeral 902, false peaks can be suppressed when applying the Radon transform described in connection with act 708. Suppression of false peaks can be accomplished by constraining local maximum peaks to peaks that satisfy $$\frac{d^2 \sigma_\theta^2}{d\theta^2} > 0.$$

Such a constraint can operate to reduce false peaks given that the values provided by a Radon transform typically have larger variation $\sigma_\theta^2$ along the true line direction.

Furthermore, at reference numeral 904, a median number, N, of feature points per row for the EPI can be computed. Next, at reference numeral 906, at most N local maximum peaks are extracted for further limiting the members of the set of possible interpolation directions described at act 708. Since the median number of feature points per row can more accurately reflect the number of feature lines in the EPI, extracting N feature points can greatly reduce the candidate interpolation directions.

Figure 10:
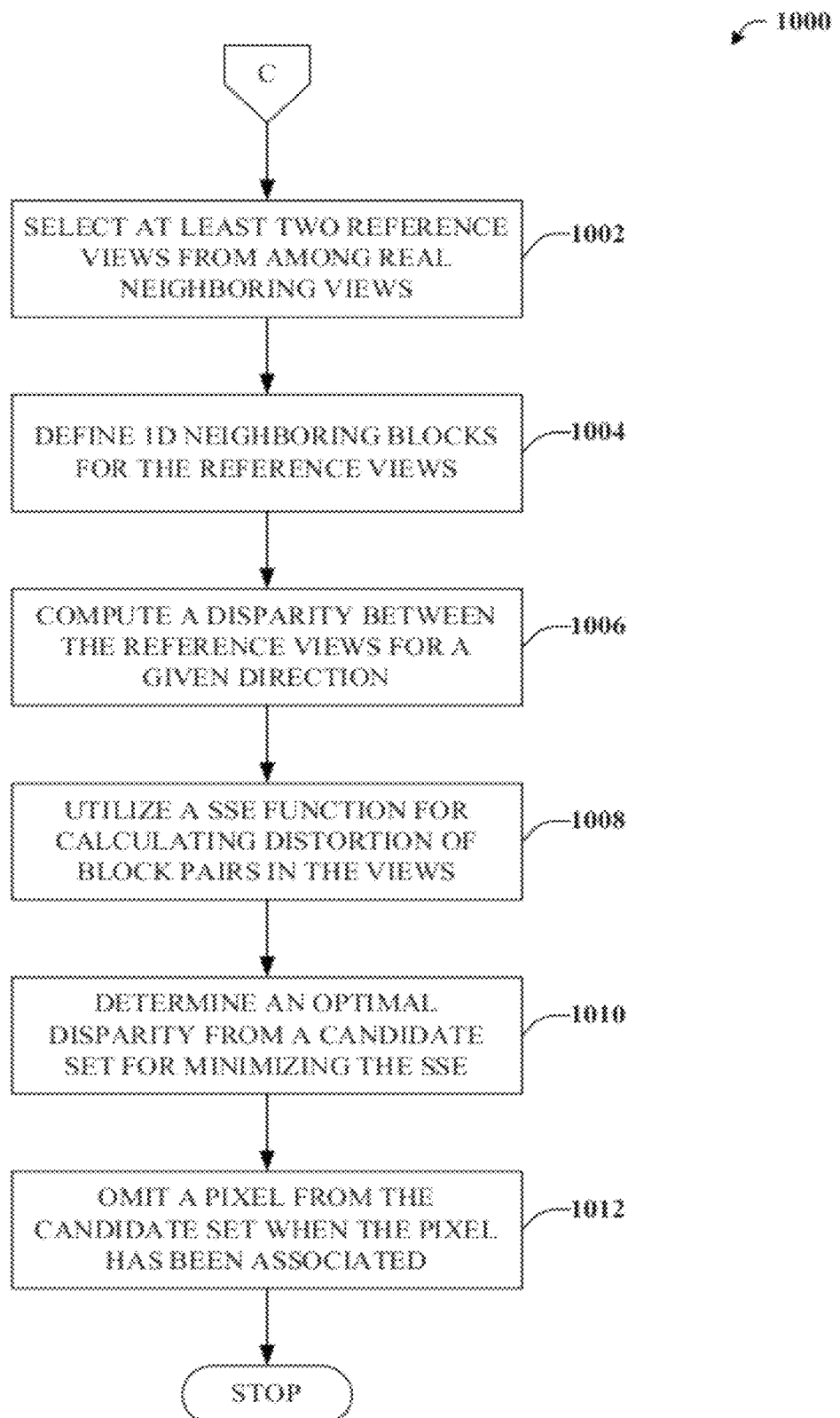
FIG. 10 is an exemplary flow chart of procedures defining a method for providing an enhanced block matching technique for facilitating an interpolated virtual view.

Turning now to FIG. 10, method 1000 for providing an enhanced block matching technique for facilitating an interpolated virtual view is provided. In particular, at reference numeral 1002, at least two reference views can be selected from among real neighboring views. Such reference views can be real views and denoted r and r+k. Furthermore, such reference views can be the nearest immediate neighbors of a virtual view. At reference numeral 1004, 1D neighboring blocks can be defined for reference views r and r+k.

Next, at reference numeral 1006, a disparity, d, between reference views r and r+k can be computed for a given direction. Then, at reference numeral 1008, a SSE function can be utilized for calculating distortion of block pairs in r and r+k, where block size is 2W+1 and the SSE function can be provided by equation (4) supra.

Thus, at reference numeral 1010, an optimal disparity, $d_{opt}$, can be determined from amongst a candidate set, D, for minimizing the SSE function of act 908 according to equation (5) recited above. Finally, at reference numeral 1012, a pixel can be omitted from the candidate set when the pixel has been associated during previous interpolation. In accordance therewith, the candidate direction set can include not only the possible directions detected in the current EPI, but also the optimal ones inherited from the previous EPI during interpolation.

Figure 11:
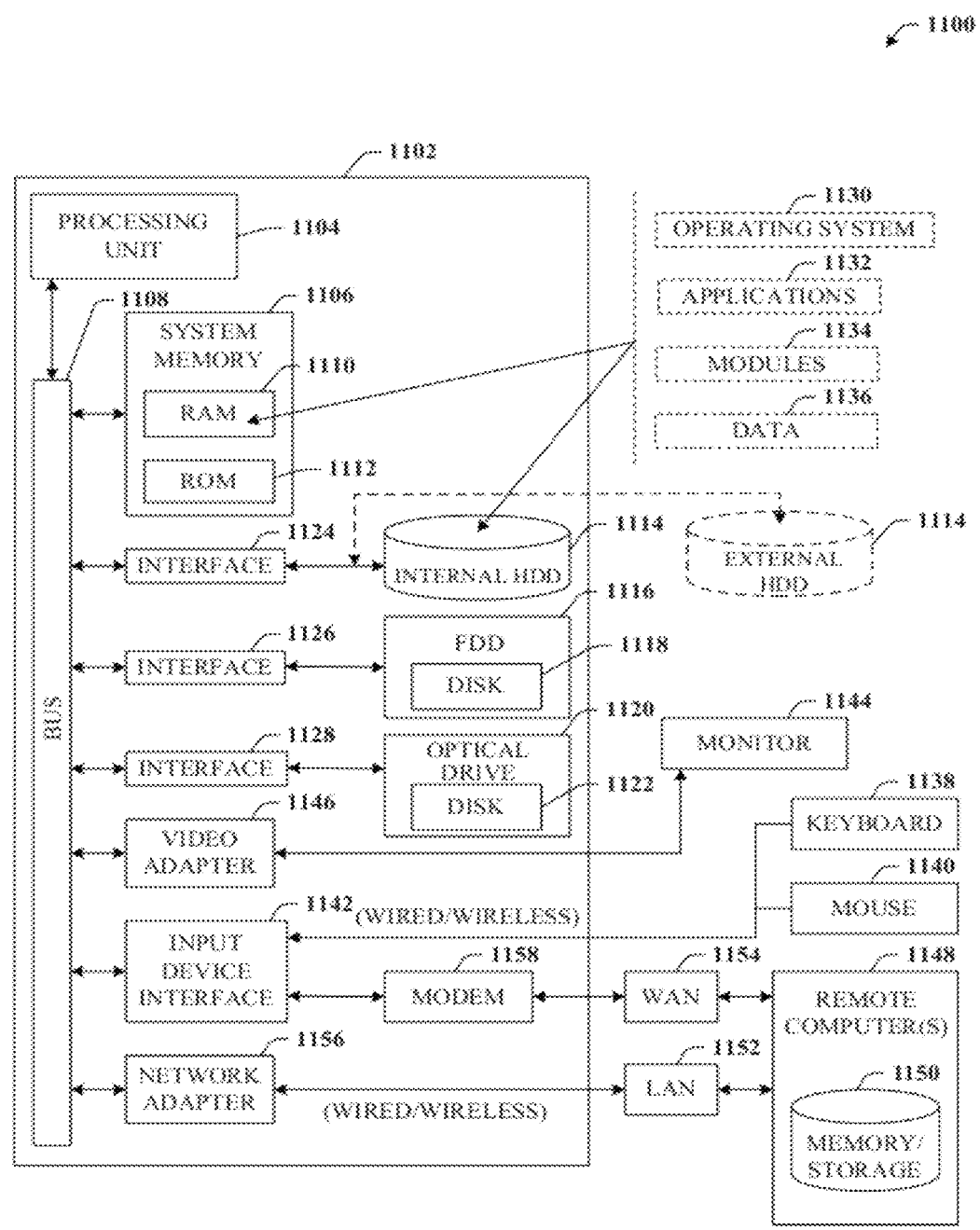
FIG. 11 illustrates a block diagram of a computer operable to execute the disclosed architecture.

Referring now to FIG. 11, there is illustrated a block diagram of an exemplary computer system operable to execute the disclosed architecture. In order to provide additional context for various aspects of the claimed subject matter, FIG. 11 and the following discussion are intended to provide a brief, general description of a suitable computing environment 1100 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the claimed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the claimed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 12:
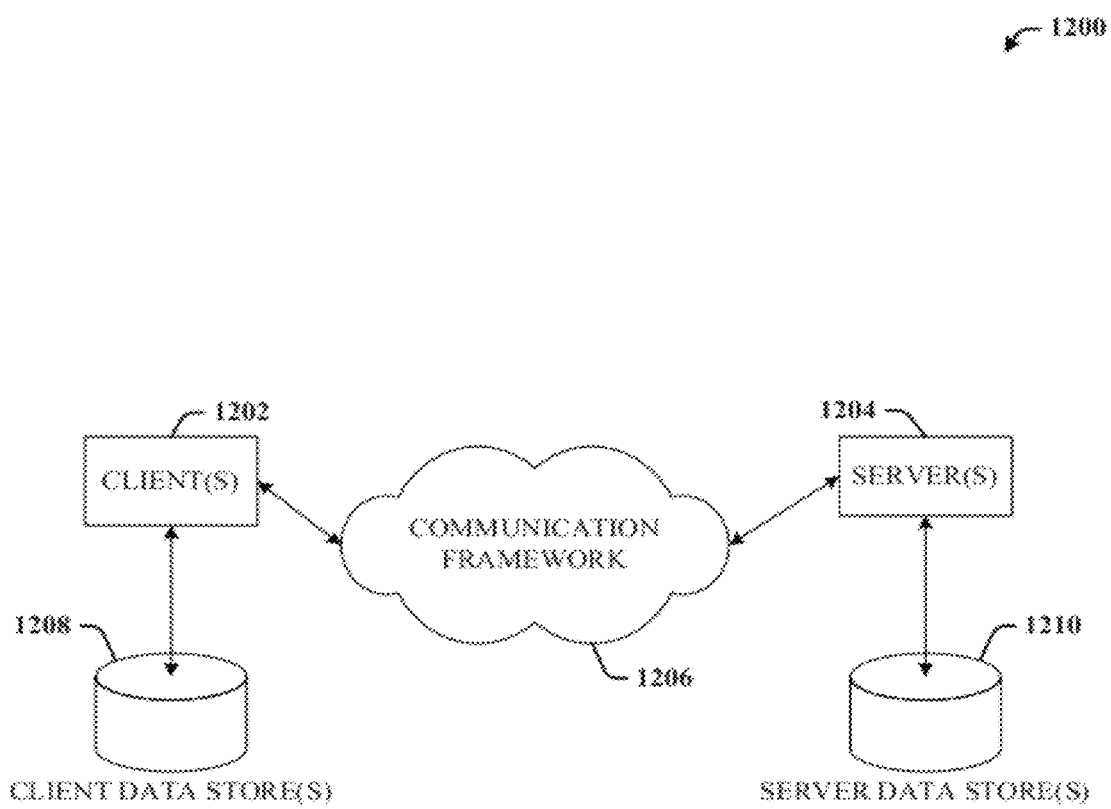
FIG. 12 illustrates a schematic block diagram of an exemplary computing environment.

Referring now to FIG. 12, there is illustrated a schematic block diagram of an exemplary computer compilation system operable to execute the disclosed architecture. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method, comprising:
    extracting, by a device including a processor, a set of feature points from an epipolar plane image (EPI), a feature point of the set of feature points corresponds to a scene point in an image of a scene;
    creating a feature epipolar plane image (FEPI) based on the extracted set of feature points;
    mapping the feature point to a line in the FEPI;
    determining a slope of the line including applying a Radon transform to the FEPI to identify a candidate set of pixels in the FEPI; and
    omitting at least one pixel from the candidate set of pixels that has been associated with another feature point of the set of feature points and has a sum of square error meeting a defined condition.

2. The method of claim 1, wherein the determining the slope further comprises determining a number representing a median number of feature points per row of the EPI, and setting a maximum number of extracted local maximum peaks to the number in order to reduce an amount of candidate slopes from which the slope is selected.

3. The method of claim 1, further comprising selecting the feature point from a substantially continuous series of feature points included in a row of the EPI, the representative feature point corresponding to a highest intensity pixel.

4. The method of claim 1, wherein the extracting the set of feature points comprises extracting the set of feature points corresponding to pixels of the EPI with respective intensities exceeding a threshold according to an intensity function.

5. A non-transitory computer-readable medium having instructions stored thereon that, in response to execution, cause a device including a processor to perform operations, comprising:
    extracting a set of feature points from an epipolar plane image (EPI), a feature point of the set of feature points corresponds to a scene point in an image of a scene;
    generating a feature epipolar plane image (FEPI) as a function of the extracted set of feature points;
    mapping the feature point to a line in the FEPI;
    determining a slope of the line including applying a Radon transform to the FEPI to identify a candidate set of pixels in the FEPI; and
    omitting at least one pixel from the candidate set of pixels that has been associated with another feature point of the set of feature points and has a sum of square error less than a threshold.

6. The non-transitory computer-readable medium of claim 5, wherein the determining the slope further comprises determining a number that represents a median number of feature points per row of the EPI, and setting a maximum number of extracted local maximum peaks to the number to reduce an amount of candidate slopes from which the slope is selected.

7. The non-transitory computer-readable medium of claim 5, the operations further comprising selecting the feature point from a substantially continuous series of feature points included in a row of the EPI, the feature point corresponding to a highest intensity pixel.

8. The non-transitory computer-readable medium of claim 5, wherein the extracting the set of feature points comprises extracting the set of feature points corresponding to pixels of the EPI with respective intensities exceeding a threshold according to an intensity function.

9. The non-transitory computer-readable medium of claim 5, wherein the set of feature points included in the FEPI correspond to respective scene points at disparate depths.

10. A system, comprising:
    means for extracting a set of feature points from an epipolar plane image (EPI), wherein a feature point of the set of feature points corresponds to a scene point in an image of a scene;
    means for generating a feature epipolar plane image (FEPI) as a function of the extracted set of feature points;
    means for mapping the feature point to a line in the FEPI; and
    means for determining a slope of the line including applying a Radon transform to the FEPI to identify a candidate set of pixels in the FEPI and omitting at least one pixel from the candidate set of pixels that has been associated with another feature point of the set of feature points and has a sum of square error meeting a threshold.

11. The system of claim 10, wherein the means for determining the slope further comprises means for determining a number that represents a median number of feature points per row of the EPI, and setting a maximum number of extracted local maximum peaks to the number to reduce an amount of candidate slopes from which the slope is selected.

12. The system of claim 10, further comprising means for selecting the feature point from a substantially continuous series of feature points included in a row of the EPI, the feature point corresponding to a highest intensity pixel.

13. The system of claim 10, wherein the extracting the set of feature points comprises extracting the set of feature points corresponding to pixels of the EPI with respective intensities exceeding a threshold according to an intensity function.

14. The system of claim 10, wherein the set of feature points included in the FEPI correspond to respective scene points at disparate depths.

15. A system, comprising:
a processor; and
a memory communicatively coupled to the processor, the memory having stored therein computer-executable instructions, comprising:
 a feature extractor component configured to at least extract a set of feature points from an epipolar plane image (EPI),
 wherein a feature point of the set of feature points corresponds to a scene point in an image of a scene, and generate a feature epipolar plane image (FEPI) as a function of the extracted set of feature points; and
 an interpolation component configured to at least map the feature point to a line in the FEPI,
  determine a slope of the line including applying a Radon transform to the FEPI to identify a candidate set of pixels in the FEPI, and
  omit at least one pixel from the candidate set of pixels that has been associated with another feature point of the set of feature points and has a sum of square error satisfying a defined condition.

16. The system of claim 15, wherein the interpolation component is further configured to determine the slope by determining a number that represents a median number of feature points per row of the EPI, and setting a maximum number of extracted local maximum peaks to the number to reduce an amount of candidate slopes from which the slope is selected.

17. The system of claim 15, wherein the feature extractor component is further configured to select the feature point from a substantially continuous series of feature points included in a row of the EPI, the feature point corresponding to a highest intensity pixel.

18. The system of claim 15, wherein the feature extractor component is further configured to extract the set of feature points corresponding to pixels of the EPI with respective intensities exceeding a threshold according to an intensity function.

19. The system of claim 15, wherein the set of feature points included in the FEPI correspond to respective scene points at disparate depths.

20. The method of claim 1, wherein the set of feature points included in the FEPI correspond to respective scene points at disparate depths.

* * * * *